United States Patent [19]

Abele

[11] Patent Number: 4,512,058
[45] Date of Patent: Apr. 23, 1985

[54] APPARATUS FOR UNHAIRING SLAUGHTERED LIVESTOCK

[75] Inventor: Günter Abele, Neuler, Fed. Rep. of Germany

[73] Assignee: Machinefabriek G. J. Nijhuis B.V., Netherlands

[21] Appl. No.: 341,990

[22] PCT Filed: May 18, 1981

[86] PCT No.: PCT/EP81/00050
§ 371 Date: Jan. 15, 1982
§ 102(e) Date: Jan. 15, 1982

[30] Foreign Application Priority Data

May 16, 1980 [NL] Netherlands ............... 8002849

[51] Int. Cl.³ .............................................. A22B 5/08
[52] U.S. Cl. .................................... 17/20; 17/18
[58] Field of Search ................................ 17/18, 20

[56] References Cited

U.S. PATENT DOCUMENTS

| 2,614,286 | 10/1952 | Ittel | 17/18 X |
| 3,472,499 | 10/1969 | Burch | 17/20 X |
| 3,703,744 | 11/1972 | Dillon | 17/20 X |

FOREIGN PATENT DOCUMENTS

| 330604 | 12/1974 | Australia | 17/20 |
| 533548 | 12/1954 | Belgium | 17/20 |
| 660753 | 7/1965 | Belgium | 17/20 |
| 2047323 | 4/1971 | Fed. Rep. of Germany | 17/20 |
| 2723662 | 11/1978 | Fed. Rep. of Germany | 17/20 |
| 737569 | 10/1932 | France | 17/20 |
| 1345668 | 11/1963 | France | 17/20 |
| 6701666 | 8/1967 | Netherlands | 17/20 |
| 532899 | 3/1973 | Switzerland | 17/18 |

Primary Examiner—Willie G. Abercrombie
Attorney, Agent, or Firm—Arnold, White & Durkee

[57] ABSTRACT

The present invention relates to a method, as well as to a system for carrying out said method, for dehairing slaughtered livestock. A carcass following a warm water treatment is roughly dehaired by means of beating and scraping tools while simultaneously being rotated around its longitudinal axis. Then fine hairs are removed using burner means while still rotating the carcass. A special feature of the invention involves the removal of fine hairs over the whole length of the carcass using burners acting on various zones of the carcass with differences in operating time and/or intensity. In the system according to the invention, differential burner action may be achieved using pivotable burners or reciprocating burners. Alternatively, differential burner action may be achieved using fixed burners having different flame intensities or operating times.

14 Claims, 7 Drawing Figures

APPARATUS FOR UNHAIRING SLAUGHTERED LIVESTOCK

The invention relates to a method for unhairing slaughtered cattle, especially pigs, whereby the dead body is first subjected to a warm water treatment, then roughly unhaired by means of beating and scraping tools while the body is simultaneously rotated around the longitudinal axis of the body, and after completion of this rough unhairing process, the remaining fine hairs are removed using a burner.

A similar method is disclosed in German Pat. No. 20.47.323. To shorten the unhairing period in the system disclosed in the German Patent, the body is flamed already over its whole length during the rough unhairing process carried out by the beat means. This is based on the mistaken idea that the heat of the flame results in erecting the hairs, so that the pulling of hairs out of the skin using the beat and scrape means is improved. However, practice has shown that a flame, extending over the whole length of the body, will shorten the hairs, such that the hairs will not be pulled out of the skin anymore by said beat and scrape means. In such prior methods, an increased volume of hairs had to be burnt away. Therefore a much greater volume of hair residue than is desirable would remain in the skin of the slaughtered animal.

It was already known in the prior art to start with removing the long hairs completely using said beat and scrape means. This would result in carrying out a rough unhairing process. Rough unhairing would typically be followed by removing the remaining fine hairs using a hand operated flame.

The method according to the above mentioned German Pat. No. 20.47.323 results on the one hand with a time saving in relation to said last mentioned method of using a hand operated flame. On the other hand, however, the method described in the German Patent resulted in a decrease in quality, because such a method not only leaves more hair residue in the skin than is desirable, but also the constant flame intensity over the whole length of the body will result in local overheating of sections of the body. It is more difficult to unhair the head section of a pig than the belly section. Using a constant flame jet extending over the whole length of the body is unsatisfactory because of the fact that unhairing the head section is more difficult than unhairing the belly section, and more hair has to be burnt away from the body in that method because the flame shortens the hairs and results in less hairs being pulled out by the beat and scrape means. This will typically result in a splitting of the belly section because of overheating.

An object of the present invention is to provide a method for eliminating the above mentioned problems. According to the invention, this object is reached in that fine hair removing is carried out over the whole length of the body using burners acting on various zones of the body with differences in operating time and/or strength.

The invention is thus based on the idea, which is in itself known from the German Offenlegungsschrift No. 12.98.894, that the body should be roughly unhaired completely using mechanical beat and scrape means. In that case, the majority of the hairs are pulled out of the skin, so that residue hairs will not remain on the animal's body.

Furthermore, the knowledge that it is possible to remove the remaining fine hairs using a burner plays a part in the invention. According to the prior art, one removes the fine hairs after the rough unhairing process using a hand operated burner. Said treatment however is very arbitrary and is either insufficient or results in local overheating. The person carrying out this treatment is not able to see exactly what he is doing during the burning process, and is only able to see from the result that he has to do more or that he has overdone it. If he has overdone it, the damage is beyond remedy.

According to the present invention, the operating time or the intensity, or both, of the burners acting onto different sections of the body are adapted to the local circumstances of that section of the body. In this way, damage to body sections from overheating will be avoided. Removing hairs from the head section is more difficult than removing hairs from the rear section. In both the head and rear sections, removing hair is more difficult than in the belly section. Therefore, one may use burners of equal flame strength, which are controlled to operate during a variable time period. However, it is also possible to use burners of different flame strength. Experiments, carried out on a certain type of animal, will give data about the desired operating time and flame strength. In a machine built in accordance with the present invention, such parameters can be maintained continuously without the disadvantageous influence of human errors.

According to the invention, it is possible to treat a body with at least one burner which is able to swing to and fro around a fixed shaft. The burner is controlled such that the flame more strongly affects both ends of the body, by operating at both ends of the body longer than in the central part of the body. A control of this type should be implemented so that at both ends of the swinging movement, that is, there where the direction of movement is reversed, either the pressure in the burners is increased, or the burners are operated longer at the end sections of the animal. The nature of the swinging movement may be implemented so that the burners operate longer at the end sections of the animal.

It is also possible to use swiveling burners, one for the front of the body and one for the rear half of the body. Swiveling burners should be implemented so that they reverse their swinging movements near the central section of the body faster than at the other reversing point of their swinging movement.

Furthermore, one may use one burner which is movable parallel to the longitudinal axis of the body. This kind of a burner should be moved to and fro with such a varying speed that the flame action time at the head section and the tail section of the body is longer than the action time at the central body section. As a result of the nature of the movement, such a to and fro moving burner will act more intensively at the end sections of the animal in comparison to the central section. One may also increase the flame strength near the reversing points of the movement.

Alternatively, according to the invention, it is possible to use a number of stationary burners, of which separate burners or groups of burners are controlled by a timer or are configured to function with different intensity.

For removing the fine hairs usually five or six rotations are necessary. For the rear section four to five rotations are necessary, and for the central section three or four rotations are necessary. Variation in operating time and flame strength results in savings of energy.

The invention furthermore relates to a system for carrying out the various methods. The system includes a grate for supporting the body that is to be treated. A drive shaft is provided underneath the grate having beat and scrape means extending between the grate bars and through the grate. Such a system is known from the above mentioned German Patents No. 12.98.894 and No. 20.47.323. In the system according to the last mentioned publication, a series of burners is also positioned above the grate. The burners are directed to the body to treat it during scraping. The burners are all intended to be switched on simultaneously during a fixed time period.

The system according to the invention may be embodied into several configurations all functioning to obtain a difference in operating time and/or intensity of the flame action upon the sections of the animal's body.

The system may comprise at least one burner installed above the grate, swiveling around a horizontal axis transverse to the axis of said beat and scrape means. The burner swings about a fixed point and may be moved in the correct way by means of control mechanisms which are themselves known, to assure that the flame action has the desired influence everywhere.

Furthermore, one could use two burners installed above the grate swiveling around transversal axes and each functioning for treating a part of the body.

According to a further embodiment, a guide rail is installed above the grate, supporting a burner which is movable to and fro parallel to the axis of the beat means. The lingering period of said burner at the reversing positions in the to and fro movement will be longer than in the central section, and if necessary, one could also impose speed differences upon the burner's movement. It is furthermore possible to increase the flame strength at the end section. For instance, an operating lever of a gas valve could be used in cooperation with a detension element, and brought back into the initial position by means of spring pressure.

According to a further embodiment, one may use stationary burners functioning with varying pressures and/or varying orifices. Or one may use stationary burners functioning during varying operating times determined by a timer. It is, for instance, possible first to start the burners operating on the head section, then approximately one rotation later to open the gas supply to the burners operating onto the rear section, and again one rotation later to start the burners operating onto the central section. All burners can be closed simultaneously.

The invention will be explained in more detail with reference to the drawings.

Figure 1:
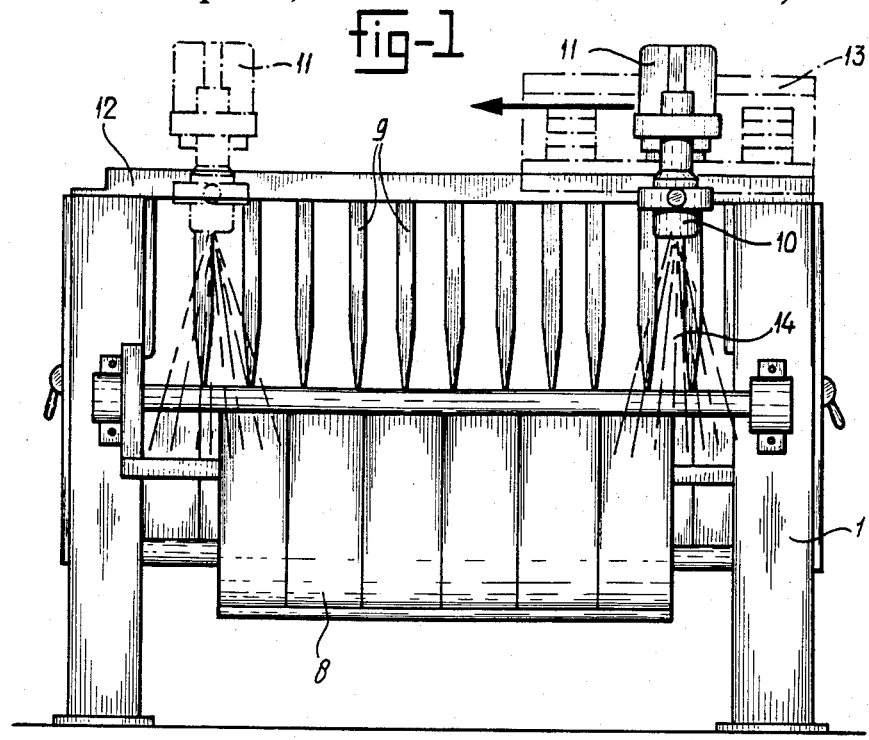
FIG. 1 illustrates schematically a front view of a first embodiment of a system according to the invention.
Figure 2:
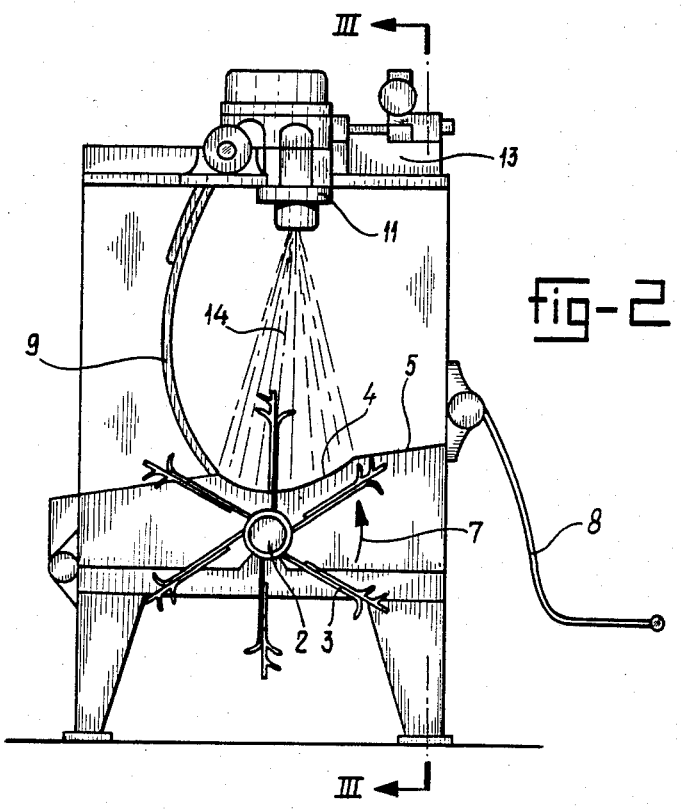
FIG. 2 illustrates schematically a side view of the system according to FIG. 1.

The system shown in FIGS. 1 and 2 comprises a frame 1 supporting a shaft 2 having flexible beat and scrape means 3. The frame 1 carries a grate 5 consisting of bars. The central part of the grate 5 is at 4 somewhat bent downwards in the form of a pit destined for receiving the body of a pig.

The rods 3 are able to move between the grate bars during their rotation in the arrow direction 7. A second grate 9 with bent or curved bars extends from the grate 5 upwards. The beat means 3 turns the animal's body during their rotation while the body is supported by the grate bars 5 and the grate bars 9. This is a known technique which is in more detail discussed in, for instance, the German Pat. No. 20 37 323. A further grate is denoted with 8, which grate 8 functions for guiding the body into the system. Furthermore, the frame 1 has in its upper part a rail track 12 carrying a movable burner 11, which includes a flame nozzle 10. The burner 11 is moved to and fro by means of an electric motor 13, which drives the burner 11 for instance by means of a chain or a screwed spindle. The flame 14 is directed downwards. If the burner 10, 11 is driven with invariable speed, then the deceleration and acceleration during reversing of the movement direction at the ends of the rail track 12 will result into a prolonged flame effect at those positions.

FIG. 1 shows a burner near both end positions.

Figure 3:
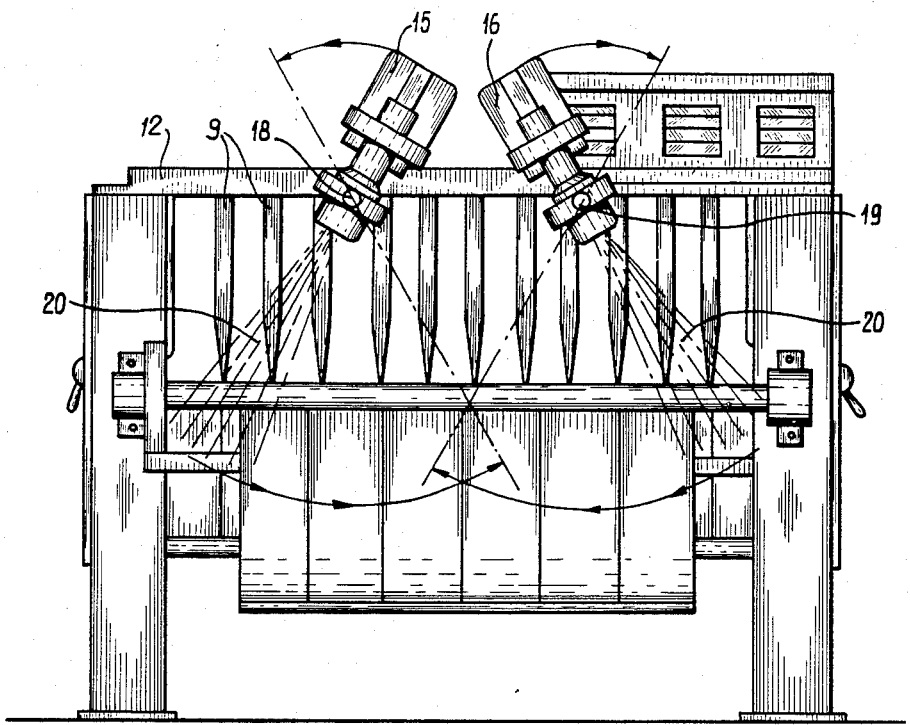
FIG. 3 shows schematically a front view of another embodiment.
Figure 4:
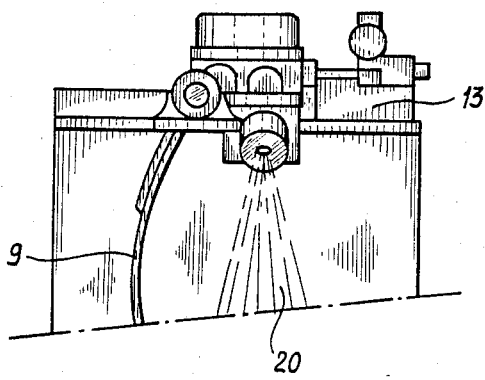
FIG. 4 shows schematically a side view of the embodiment of FIG. 3.

In the embodiments according to FIGS. 3 and 4, two burners 15 and 16 are swivelably supported on two transversal axes 18 and 19. The flames, denoted with 20, which are acting into the swiveling area of the burners 15 and 16, shown in FIG. 3, can be controlled such that they have a prolonged affecting period in the illustrated end positions in comparison to the unillustrated other end positions. Instead of opposed swinging movements, the burners 15 and 16 may move synchronously so that the flames 20 are parallel to each other under all circumstances. In that case, one avoids overlapping of the flames 20 of both burners 15 and 16 in the central area.

Figure 5:
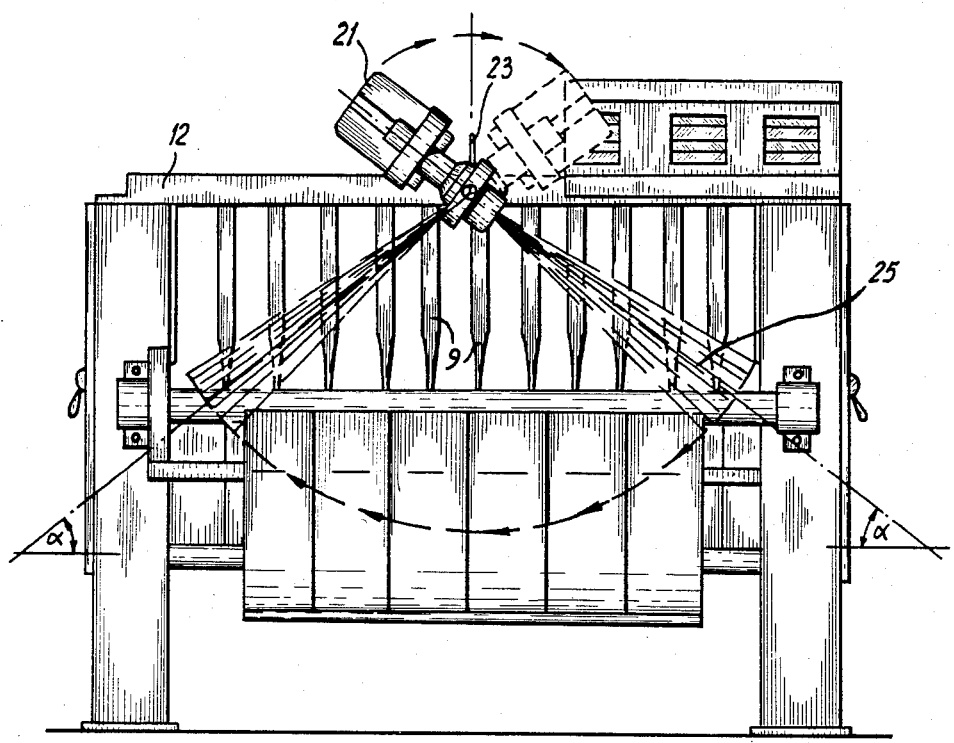
FIG. 5 shows schematically a front view of another embodiment.

FIG. 5 shows an embodiment with only one burner 21, which may swing around a centrally positioned shaft 23. The shaft 23 can be driven such that the flame 25, which has at the reversing end points of the swiveling movement the greatest distance to the body, lingers longer in the end positions than in the central zone, and especially driven such that the flame 25 passes the central area at increased speed. Such a movement may be controlled using known means, for instance cam elements or eccentric elements.

Figure 6:
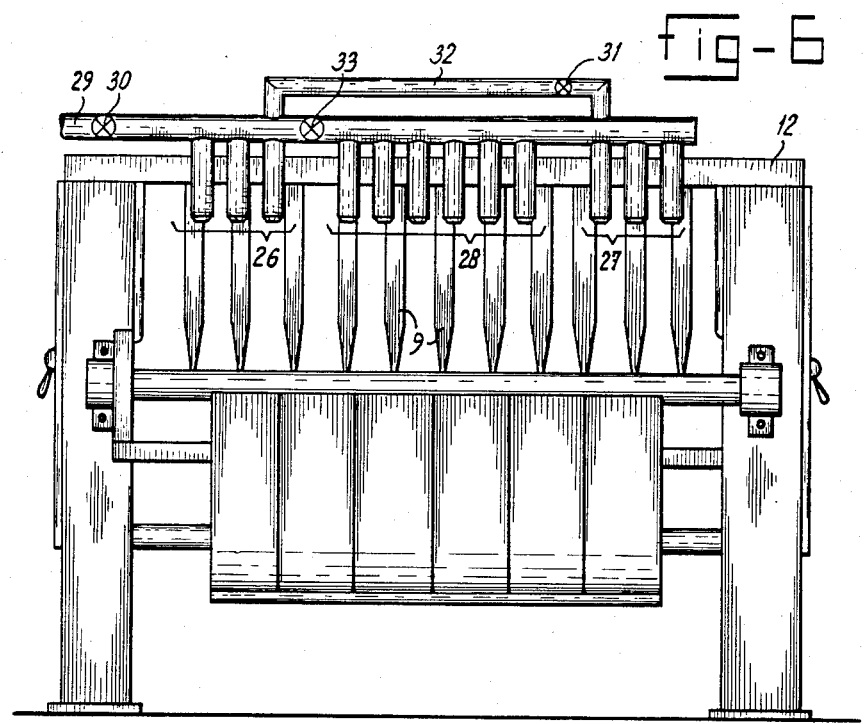
FIGS. 6 and 7 show front views of embodiments with fixed positioned burners.

In the embodiment of FIG. 6, a series of stationary burners are positioned divided into a first group 26, a second group 27 and a third group 28. All burners are connected to a gas pipe 29 with a main stop cock 30, a stop cock 31 into a branch 32 shunting the central group of burners 28 and a stop cock 33. All stop cocks can be controlled by time control mechanisms, such that first of all the stop cock 30 will be opened activating the burners 26, thereafter the stop cock 31 will be opened activating the burners 27, and thereafter the stop cock 33 will be opened for the burners 28. All stop cocks will be closed simultaneously. Suitable time control mechanisms are known.

Of course, it is also possible to close the stop cocks 30, 31 and 33 at different times.

Figure 7:
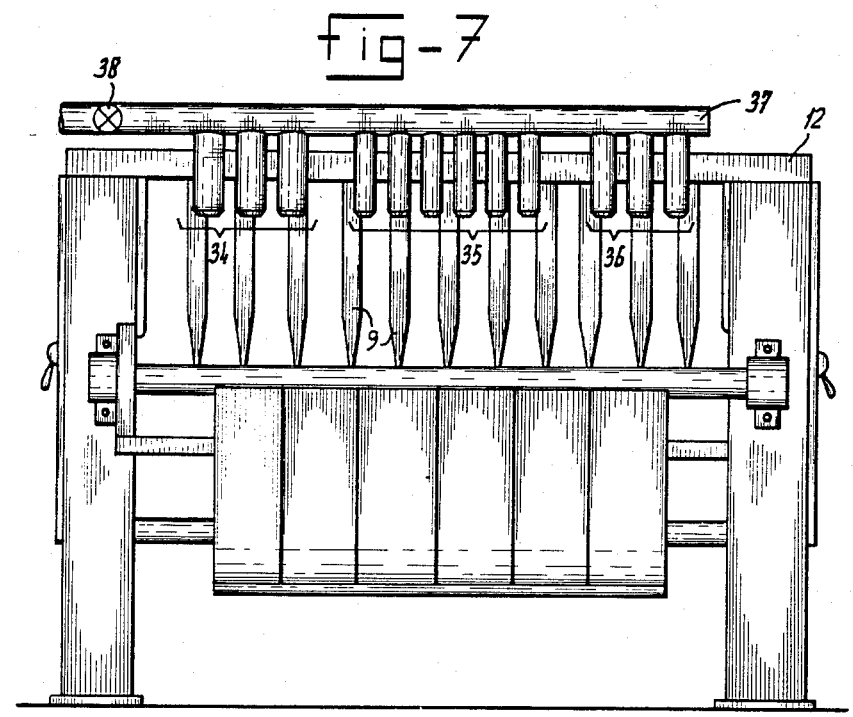

FIG. 7 shows a variant of the embodiment of FIG. 6. This variant embodiment includes three groups of burners, 34, 35 and 36, all connected to the same gas pipe 37 with a stop cock 38. The burners 35 have the smallest mouthpiece or nozzle diameter. The burners of the group 36 have a somewhat greater nozzle diameter. The burners of the group 34 have the greatest nozzle diameter. As a result, the flame strength is adapted to the local circumstances.

When unhairing slaughtered animals, especially pigs, on a production line, one in general deals with animals having dimensions which are not significantly different. Skin and hair characteristics are also generally comparable.

Because there are production lines which have to treat 500 to 1000 pigs per hour, which number also has to be unhaired, it will be clear that with such pig production numbers and with the very short lingering periods of the corpses in the unhairing machine, the continuous maintenance of fixed parameters for the process in which the fine hairs are removed by means of flames is of extremely great significance. That is, for the first time, completely possible with the method and system according to the invention, thereby avoiding a local decrease in the quality of the meat.

I claim:

1. Apparatus for unhairing slaughtered livestock, comprising, in combination:

hot water treatment apparatus for treating a carcass with hot water to prepare hairs on the carcass for further hair removal operations;

dehairing apparatus for scraping the carcass, the dehairing apparatus being adapted to receive the carcass and to rotate the carcass, the dehairing apparatus including scrapers, the scrapers being adapted to remove a substantial portion of the hair on the carcass after the hair has been pretreated with hot water; and, means for differentially heating the carcass after scraping to remove additional hair which is more difficult to remove, without overheating the valuable belly section of the carcass, said means including at least one pivotally mounted burner, the burner being supported by the dehairing apparatus near to the carcass so that the burner can burn away hairs which were not removed by the scrapers, the burner being pivotally mounted on a pivotal axis, said pivotal axis extending in a direction which is generally transversely oriented with respect to the length of the carcass, so that a flame produced by the burner may be directed up and down at least a portion of the length of the carcass by pivoting the burner about said pivotal axis, the burner being pivotally moveable so that the flame is directed toward the head section of the carcass or the rear section of the carcass for a period of time that is longer than the period of time that the flame is directed toward the belly section of the carcass, the burner being operable to single hair remaining upon the carcass after scraping including hair upon the head section and rear section of the carcass, without overheating the belly section of the carcass, while the carcass is rotated in the dehairing apparatus.

2. The apparatus according to claim 1, further comprising:

a second burner, the second burner being pivotally mounted, the second burner being supported by the dehairing apparatus near to the carcass and spaced further down the length of the carcass from the first burner, the second burner being pivotally mounted on a second pivotal axis, said second pivotal axis extending in a direction which is generally transversely oriented with respect to the length of the carcass, so that a second flame produced by the burner may be directed up and down a portion of the length of the carcass by pivoting the second burner about said second pivotal axis, the second burner being pivotally moveable so that the second flame is directed toward the rear section of the carcass for a period of time that is longer than the period of time that the second flame is directed toward the belly section of the carcass, the first burner being pivotally moveable so that the first flame is directed toward the head section of the carcass for a period of time that is longer than the period of time that the first flame is directed toward the belly section of the carcass, the second burner being operable to singe hair remaining upon the rear section and a portion of the belly section of the carcass after scraping without overheating the belly section of the carcass, while the carcass is rotating, and the first burner being operable to singe hair remaining upon the head section and a portion of the belly section of the carcass after scraping without overheating the belly section of the carcass, while the carcass is rotating.

3. The apparatus according to claim 2, wherein:
said first pivotal axis and said second pivotal axis are substantially parallel.

4. The apparatus according to claim 3, wherein:
the first burner and the second burner move synchronously, so that the burners remain generally parallel to each other as the first and second burners pivot about the first and second pivotal axes, respectively.

5. The apparatus according to claim 2, wherein:
the first burner and the second burner move synchronously, so that the burners remain generally parallel to each other as the first and second burners pivot about the first and second pivotal axes, respectively.

6. The apparatus according to claim 2, wherein:
the first burner and the second burner point in a direction alternately towards and away from each other as the first and second burners pivot about the first and second pivotal axes, respectively.

7. The apparatus according to claim 1, claim 2, claim 4, claim 5, or claim 6, wherein:
the dehairing apparatus further comprising a grate having generally parallel bars spaced apart from each other, the grate being adapted to receive and support the carcass, the dehairing apparatus further comprising a rotatable shaft which has rods extending outwardly therefrom, the rods having scraping tools adapted for scraping a substantial portion of the hair from the carcass after the hair has been pretreated with hot water, the rods being positioned so that the rods may pass between the bars of the grate when the shaft is rotated, the rods including a bent portion adapted to cause the carcass to rotate upon the grate when the shaft is rotated.

8. Apparatus for dehairing slaughtered livestock, said apparatus comprising in combination a frame, a grate consisting of spaced apart parallel bars each in a plane perpendicular to the longitudinal axis of the frame, said grate having a downwardly curved portion for receiving the body to be treated, a shaft, extending parallel to the longitudinal axis of the frame and below the grate, said shaft being connected with means for rotating it and further being provided with rods in planes perpendicular to said shaft and between the bars of the grate which rods carry scraping tools at their outer ends, which upon rotation of the shaft move through the gaps between the said bars of the grate and above the level of a lower portion of the grate bars, said frame carrying a downwardly directed burner above the grate in a vertical plane through the axis of the shaft, the burner being mounted on a carriage provided with means for moving it to and fro in the longitudinal direction of the frame.

9. Apparatus for dehairing slaughtered livestock, said apparatus comprising in combination a frame, a grate consisting of spaced apart parallel bars each in a plane perpendicular to the longitudinal axis of the frame, said grate having a downwardly curved portion for receiving the body to be treated, a shaft, extending parallel to the longitudinal axis of the frame and below the grate, said shaft being connected with means for rotating it and further being provided with rods in planes perpendicular to said shaft and between the bars of the grate which rods carry scraping tools at their outer ends, which upon rotation of the shaft move through the gaps between the said bars of the grate and above the level of the lower grate bars, said frame carrying a downwardly directed burner above the grate in a vertical plane through the axis of the shaft, the burner being mounted in the central transverse plane of the frame and is provided with means to swing it to and fro about a horizontal transverse axis of the frame between outer positions in which the axis of the burner is directed towards the ends of the grate.

10. Apparatus for dehairing slaughtered livestock, said apparatus comprising in combination a frame, a grate consisting of spaced apart parallel bars each in a plane perpendicular to the longitudinal axis of the frame, said grate having a downwardly curved portion for receiving the body to be treated, a shaft, extending parallel to the longitudinal axis of the frame and below the grate, said shaft being connected with means for rotating it and further being provided with rods in planes perpendicular to said shaft and between the bars of the grate which rods carry scraping tools at their outer ends, which upon rotation of the shaft moves through the gaps between the said bars of the grate and above the level of the lower grate bars, said frame carrying a downwardly directed burner above the grate in a vertical plane through the axis of the shaft, two burners being mounted in two different spaced apart transverse planes of the frame, each one above one-half of the length of the grate and each provided with means to swing said burners about horizontal transverse axes.

11. Apparatus as claimed in claim 10, in which the two burners move synchronously such that the axes of the burners remain substantially parallel.

12. Apparatus as claimed in claim 10, in which the burners move in synchronism such that they move towards and away from each other.

13. Apparatus for dehairing slaughtered livestock, said apparatus comprising in combination a frame, a grate consisting of spaced apart parallel bars each in a plane perpendicular to the longitudinal axis of the frame, said grate having a downwardly curved portion for receiving the body to be treated, a shaft, extending parallel to the longitudinal axis of the frame and below the grate, said shaft being connected with means for rotating it and further being provided with rods in planes perpendicular to said shaft and between the bars of the grate which rods carry scraping tools at their outer sides, which upon rotation of the shaft move through the gaps between the said bars of the grate and above the level of the lower grate bars, said frame carrying a longitudinally extending row of downwardly directed burners above the entire length of the grate in a vertical plane through the axis of the shaft, all burners being of the same size and being divided into three different groups of burners with gas supply pipes to said groups of burners provided with time controlled supply valves.

14. Apparatus for dehairing slaughtered livestock, said apparatus comprising in combination a frame, a grate consisting of spaced apart parallel bars each in a plane perpendicular to the longitudinal axis of the frame, said grate having a downwardly curved portion for receiving the body to be treated, a shaft, extending parallel to the longitudinal axis of the frame and below the grate, said shaft being connected with means for rotating it and further being provided with rods in planes perpendicular to said shaft and between the bars of the grate which rods carry scraping tools at their outer ends, which upon rotation of the shaft move through the gaps between the said bars of the grate and above the level of the lower grate bars, a plurality of burners supported by the frame, the burners being divided into three groups, a central group having a small outlet opening, an outer group having a larger outlet opening and an opposite outer group having the largest outlet opening.

* * * * *

UNITED STATES PATENT AND TRADEMARK OFFICE
CERTIFICATE OF CORRECTION

PATENT NO. : 4,512,058

DATED : April 23, 1985

INVENTOR(S) : Gunter Abele

It is certified that error appears in the above-identified patent and that said Letters Patent is hereby corrected as shown below:

Column 5, line 11, change "pig" to -- big --.

Column 5, line 53, change "single" to -- singe --.

Column 7, line 6, after "burner" insert -- to burn away hairs not removed by said scraping tools, said burner being located --

Column 7, line 9, (at the end of claim 8), after "frame" insert -- to provide for differentially heating the body after scraping to remove additional hair which is more difficult to remove, without overheating the valuable belly section of the body, said carriage being moveable so that the flame from the burner is directed toward the head section of the body or the rear section of the body for a period of time that is longer than the period of time that the flame is directed toward the belly section of the body, the burner being operable to singe hair remaining upon the body which was not removed by said scraping tools, including hair upon the head section and rear section of the body, without overheating the belly section of the body --.

Column 7, line 24, after "burner" insert -- to burn away hairs not removed by said scraping tools, said burner being located --.

Column 7, line 26, change "frame and is" to -- frame, the burner being operable to provide differential heating of the body to remove hair which is difficult to remove with said scraping tools without overheating the valuable belly section of the body, the burner being --.

UNITED STATES PATENT AND TRADEMARK OFFICE
CERTIFICATE OF CORRECTION

PATENT NO. : 4,512,058
DATED : April 23, 1985
INVENTOR(S) : Gunter Abele

It is certified that error appears in the above-identified patent and that said Letters Patent is hereby corrected as shown below:

Column 7, line 27, change "it" to -- the burner --.

Column 7, line 29, change "axis" to -- flame --.

Column 7, line 30, (at the end of claim 9), after "grate" insert -- so that the flame of the burner may be directed toward the head section of the body or the rear section of the body for a period of time that is longer than the period of time that the flame is directed toward the belly section of the body, the burner being operable to singe hair which is difficult to remove with said scraping tools, including hair upon the head section and rear section of the body, without overheating the belly section of the body --.

Signed and Sealed this

Seventeenth Day of September 1985

[SEAL]

Attest:

DONALD J. QUIGG

Attesting Officer

Commissioner of Patents and Trademarks—Designate